United States Patent [19]

Mizokami

[11] 4,394,570
[45] Jul. 19, 1983

[54] PHOTOELECTRIC CONVERSION CIRCUIT

[75] Inventor: Kazunori Mizokami, Hachioji, Japan

[73] Assignee: Olympus Optical Company Ltd., Tokyo, Japan

[21] Appl. No.: 213,612

[22] Filed: Dec. 5, 1980

[30] Foreign Application Priority Data

Dec. 25, 1979 [JP] Japan ............................ 54/168718

[51] Int. Cl.³ ............................................ H01J 40/14
[52] U.S. Cl. ............................ 250/209; 250/214 P; 356/222
[58] Field of Search ........ 250/214 R, 214 DC, 214 P, 250/208, 209; 356/218, 222; 354/23 R, 23 D, 31, 60 R, 60 A

[56] References Cited

U.S. PATENT DOCUMENTS 3,781,119  12/1973  Mori .............................. 250/214 P
3,992,714  11/1976  Miyakawa ..................... 354/60 R
4,309,604   1/1982  Yoshikawa et al. ............. 356/222

OTHER PUBLICATIONS

Japanese Published Unexamined Patent Appln. No. Sho/52-92516, Laid-open: Aug. 4, 1977.

Primary Examiner—David C. Nelms
Attorney, Agent, or Firm—Weinstein & Sutton

[57] ABSTRACT

A photoelectric conversion circuit comprises a pair of cascade connected semiconductor switching circuits, each of which is formed by a CMOS inverter. A pair of oppositely poled, series connected photodiodes define a photometric, photoelectric transducer element. A capacitor is arranged to be charged and discharged in response to a photocurrent from the transducer element. The combination of the transducer element and the capacitor form a feedback circuit which is connected across the switching circuits to cause the latter to oscillate.

5 Claims, 3 Drawing Figures

PHOTOELECTRIC CONVERSION CIRCUIT

BACKGROUND OF THE INVENTION

The invention relates to a photoelectric conversion circuit, and more particularly, to such a circuit for use in a camera or the like for photometry of light from an object being photographed and for converting it into a corresponding electrical signal.

In photographic cameras and illumination photometers, the photometry takes place by determining extraneous light such as light from an object being photographed, deriving an electrical signal which is proportional in magnitude to the amount of light and using the electrical signal to control an exposure operation or a display on the photometer. A photoelectric conversion circuit is used to convert a light signal into an electrical signal, which is processed in terms of an analog quantity. For a camera, for example, a variety of photographing information including film speed must be supplied to the camera, which also must be processed in an analog manner. This disadvantageously results in a very complex arrangement. A technique has been proposed which converts an analog signal into a corresponding digital signal for digital processing purpose. The digital processing simplifies the processing when introducing a variety of photographing information into a photographic camera, for example, and also improves the accuracy of the photometry. When the digital processing technique is employed, the analog signal is once converted into a digital signal before it is processed. Subsequently, the digital signal must be converted into an analog signal again in order to control the pointer of an exposure meter, for example. However, the use of the analog-to-digital conversion is advantageous when the overall merits are considered.

However, a conventional digital processing technique in a photographic camera, for example, comprises compressing a photocurrent derived from a silicon photodiode, for example, by a logarithmic comparison circuit, and then converting the compressed signal into a digital signal in an analog-digital conversion circuit. The logarithmic compression circuit requires the provision of a temperature compensation circuit and a constant voltage circuit. A variety of techniques are employed to form an analog-digital conversion circuit, including a sequential comparison, a count comparison, a double integration, a follow-up comparison type. However, a conventional digital processing circuit is very complex in its entire arrangement and requires an increased power dissipation. Since such circuits are subject to temperature changes and fluctuations in the supply voltage, there must be provided a temperature compensation circuit and a voltage fluctuation compensation circuit, adding to the complexity of the entire arrangement. In addition, the conventional circuit arrangement suffers from disadvantages that it cannot respond immediately after the power supply is turned on and that it cannot respond sufficiently rapidly.

SUMMARY OF THE INVENTION

It is an object of the invention to eliminate the described disadvantages of the prior art, by providing a photoelectric conversion circuit including a feedback circuit formed by a pair of silicon photodiodes and a capacitor arranged to be charged by and discharged by the photocurrent from the photodiodes, and a semiconductor switching circuit combined with the feedback circuit to provide an oscillating operation.

In accordance with the invention, the photoelectric conversion circuit comprises the semiconductor switching circuit which may be formed by a pair of cascade connected CMOS inverters. In addition, it comprises a pair of oppositely poled series connected silicon photodiodes which act as a photometric, photoelectric transducer element, and a capacitor arranged to be charged and discharged in response to a photocurrent from the transducer element. In this manner, the circuit arrangement is very simple, thus enabling an economical and highly reliable photoelectric transducer element to be provided. The simple arrangement reduces the power dissipation and dispenses with the need for the temperature compensation.

DESCRIPTION OF PREFERRED EMBODIMENTS

Figure 1:
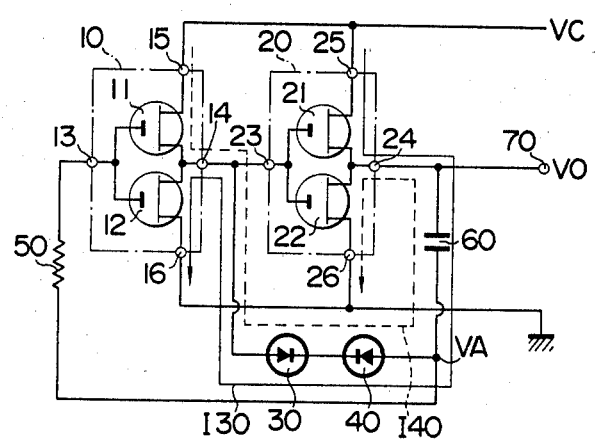
FIG. 1 is a circuit diagram of a photoelectric conversion circuit according to one embodiment of the invention.

Referring to FIG. 1, there is shown a photoelectric conversion circuit according to the invention which includes a semiconductor switching circuit formed by a pair of first and second CMOS inverters 10, 20. The conversion circuit also comprises a pair of oppositely poled, series connected silicon photodiodes 30, 40, a capacitor 60 arranged to be charged and discharged in response to a photocurrent from the photodiodes, and a protective resistor 50.

Each of the first and the second CMOS inverters 10, 20 includes a combination of PMOS transistor 11 and NMOS transistor 12 or a combination of PMOS transistor 21 and NMOS transistor 22. The gates of the transistors 11, 12 are interconnected and connected to an input terminal 13. Similarly, the gates of the transistors 21, 22 are interconnected and connected to another input terminal 23. The drains of the transistors 11, 12 are interconnected and connected to an output terminal 14 while the drains of the transistors 21, 22 are interconnected and connected to an output terminal 24. The sources of the transistors 11, 21 are respectively connected to terminals 15, 25 which are connected to a power supply VC while the sources of the transistors 12, 22 are respectively connected to terminals 16, 26 which are connected to the ground.

The output terminal 14 of the first inverter 10 is connected to the input terminal 23 of the second inverter 20, and is also connected to the anode of the silicon photodiode 30. The output terminal 24 of the second inverter 20 is connected to one end of the capacitor 60 and is also connected to an output terminal 70 of the photoelectric conversion circuit. The other end of the capacitor 60 is connected to the anode of the silicon photodiode 40, and is also connected to one end of the resistor 50, the other end of which is connected to the input terminal 13 of the first inverter 10.

The operation of the photoelectric conversion circuit will be described with reference to FIG. 2. When light impinges upon the silicon photodiodes 30, 40, a photocurrent of a magnitude which depends on the amount of light flows through the silicon photodiodes 30, 40 from their cathode to their anode. Obviously, no photocurrent flows in the absence of light input. Consequently, the photoelectric conversion circuit shown in FIG. 1 assumes a quiescent condition in the absence of light input to the photodiodes 30, 40. The quiescent condition may be assumed as one in which the transistor 11 is off while the transistor 12 is on. The resulting output signal from the first inverter 10 renders the transistor 21 on and the transistor 22 off. It may also be assumed that at this time, the capacitor 60 is charged to one-half the supply voltage VC or VC/2. As a result of the charged voltage across the capacitor 60, a voltage 3 VC/2 is applied to the input terminal 13 of the first inverter, whereby the transistors 11, 12 remain off and on, respectively. An output voltage VO from the output terminal 70 is graphically shown in FIG. 2 as is the voltage VA appearing at the junction between the other end of the capacitor 60 and the silicon photodiode 40.

Figure 2:
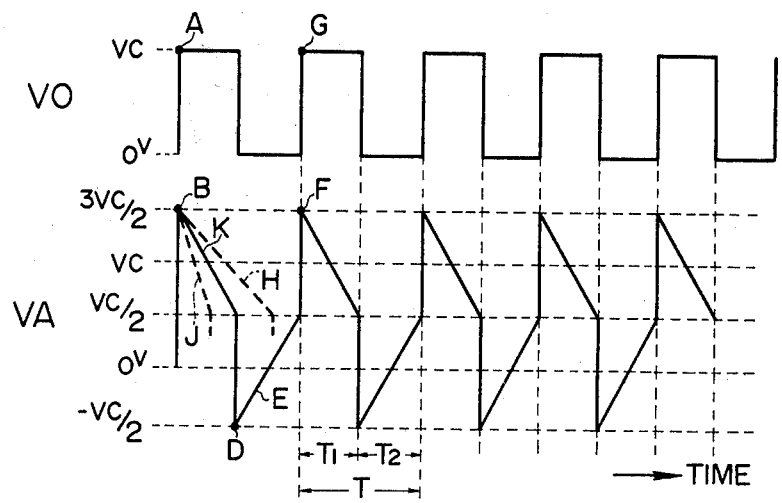
FIG. 2 shows voltage waveforms appearing in the conversion circuit of FIG. 1.

Under the condition mentioned above, the voltages VO, VA assume values of VC, 3 VC/2 indicated at points A, B in FIG. 2. Stated differently, since the transistor 21 is on, the supply voltage VC is fed through the conductive transistor 21 to appear directly at the output terminal 70 as the output voltage VO. The voltage VC/2 across the capacitor 60 is superimposed on the supply voltage VC which is fed through the conductive transistor 21, and hence the voltage VA assumes the value of 3 VC/2, as indicated at point B in FIG. 2.

The photoelectric conversion circuit remains inoperative at this time. When the photometry is initiated and light impinges upon the photodiodes 30, 40, the latter produce a photocurrent in accordance with the amount of light they received. Photocurrent passes through a path, indicated in solid line I30 in FIG. 1, including transistor 21, capacitor 60, photodiodes 40, 30, and transistor 12. As a result of such flow of the photocurrent I30, the capacitor 60 begins to discharge, whereby the voltage VA begins to decrease as indicated by an inclined line K shown in FIG. 2. As the voltage VA begins to decrease and reaches the threshold voltage of the inverter 10, which may be assumed to be VC/2, for example, the transistor 11 is turned on while the transistor 12 is turned off in the first inverter 10.

As a consequence, the output signal from the first inverter 10 turns the transistor 21 off and the transistor 22 on in the second inverter 20. Accordingly, the output voltage VO reduces to zero volts, and the voltage VA assumes a value of −VC/2 as indicated at point D in FIG. 2. When such condition is reached, the photocurrent of the silicon photodiode 40 becomes effective, and flows through a path indicated by dotted lines I40 in FIG. 1, including transistor 11, photodiodes 30, 40, capacitor 60 and transistor 22, thus charging the capacitor 60. The charging process is indicated by another inclined line E in FIG. 2. As the capacitor 60 is charged to a point where the voltage VA assumes a value of VC/2, the transistor 11 is turned off while the transistor 12 is turned on in the inverter 10 while the transistor 21 is turned on and the transistor 22 is turned off in the second inverter 20. At this time, a condition is reached which is indicated by points F, G in FIG. 2. Thus, the output voltage VO has the same value as the supply voltage VC. Subsequently, the capacitor 60 repeats a charging and discharging in response to the photocurrent from the photodiodes 30, 40, providing an oscillation as graphically indicated in FIG. 2.

The frequency or the period of this oscillation is determined in proportion to the magnitude of the photocurrent developed by the photodiodes 30, 40. Where the photocurrent I30 from the photodiode 30 has an increased value, the circuit response will shift from the inclined line K to a more steep response as indicated by dotted lines J, with consequence that the oscillation frequency increases while the period of the oscillation is reduced. Conversely, when the photocurrent I30 has a reduced magnitude, the circuit response will shift from the inclined line K to a more gradually changing response as indicated by dotted lines H. This results in a lower oscillation frequency and a greater period of oscillation.

As discussed, the photoelectric conversion circuit shown in FIG. 1 has an oscillation frequency or period of oscillation which varies in accordance with the amount of light impinging upon the photodiodes 30, 40. Consequently, the determination of the oscillation frequency or period of oscillation permits the amount of light which impinges upon these photodiodes to be determined. The photoelectric conversion circuit can be used in a photometric circuit of a photographic camera, for example, with the oscillation frequency counted by a digital counter. In this manner, the light signal can be easily converted into a digital signal.

Figure 3:
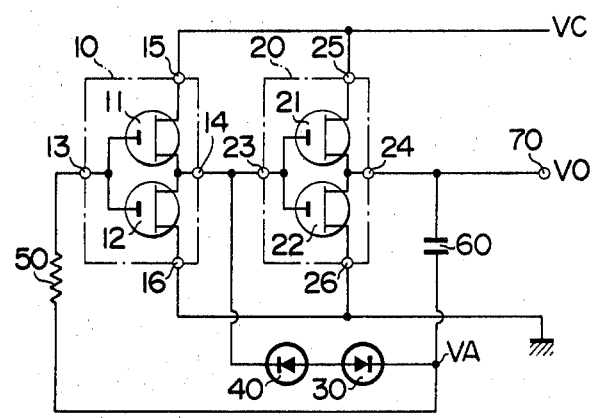
FIG. 3 is a circuit diagram of a photoelectric conversion circuit according to another embodiment of the invention.

FIG. 3 shows another photoelectric conversion circuit which is a modified version of the conversion circuit shown in FIG. 1 in that the location of the photodiodes 30, 40 is interchanged. The photodiodes 30, 40 are again series connected with each other and are oppositely poled in the same manner as in FIG. 1. In other respects, the circuit arrangement is identical to that shown in FIG. 1.

Considering the oscillation frequency of the photoelectric conversion circuit, it will be seen from FIG. 1 that the period T1 can be determined as follows:

$$T1 = C \times VC/I30$$

The period T2 shown in FIG. 2 is expressed as follows:

$$T2 = C \times VC/I40$$

Since the frequency f is the reciprocal of the combined period, we have $$f = 1/(T1 + T2)$$
$$= I30 \times I40/C \times VC(I30 + I40)$$

Assuming that the both photodiodes 30, 40 have an equal response, they will produce an equal photocurrent I, and hence the frequency can be rewritten as follows:

$$f = I/2 \times C \times VC$$

It will be seen that the frequency f is only dependent upon the magnitude of the photocurrent, the capacitance of the capacitor and the supply voltage VC, and is not dependent upon other parameters such as temperature, for example. Thus, the photoelectric conversion circuit has a response which is independent from the temperature, dispensing with the need for a temperature compensation circuit.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A photoelectric conversion circuit comprising:
a pair of series connected photodiodes having first and second connection points;
a capacitor having one side thereof connected to said first connection point of said photodiodes and arranged to be charged and discharged in response to a photocurrent from said photodiodes;
first and second semiconductor switching circuits, wherein the output of said first switching circuit is connected to the input of said second switching circuit to form a junction, and wherein said second connection point of said photodiodes is connected to said junction; and
the combination of said photodiodes and said capacitor forming a feedback circuit connected across said first and second switching circuit, whereby the switching operation of said switching circuits is effected in response to charging and discharging of said capacitor by photocurrent from said photodiodes.

2. A photoelectric conversion circuit in accordance with claim 1, wherein the other side of said capacitor is connected to the output of said second switching circuit, and wherein the first connection point of said photodiodes is also connected to the input of said first switching circuit.

3. A photoelectric conversion circuit in accordance with claim 1, wherein each of said first and second semiconductor switching circuits includes a CMOS inverter.

4. A photoelectric conversion circuit in accordance with claim 1, wherein said pair of series connected photodiodes are oppositely poled relative to each other.

5. A photoelectric conversion circuit in accordance with claim 1, wherein said pair of series connected photodiodes have substantially equal characteristics.